(12) United States Patent
Das

(10) Patent No.: US 9,525,735 B2
(45) Date of Patent: Dec. 20, 2016

(54) LOCK ELEVATION IN A DISTRIBUTED FILE STORAGE SYSTEM

(71) Applicant: FUTUREWEI TECHNOLOGIES, INC., Plano, TX (US)

(72) Inventor: Kalyan Das, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 337 days.

(21) Appl. No.: 14/067,577

(22) Filed: Oct. 30, 2013

(65) Prior Publication Data

US 2015/0120925 A1   Apr. 30, 2015

(51) Int. Cl.
*G06F 15/16* (2006.01)
*H04L 29/08* (2006.01)
*G06F 17/30* (2006.01)

(52) U.S. Cl.
CPC ..... *H04L 67/1097* (2013.01); *G06F 17/30171* (2013.01)

(58) Field of Classification Search
CPC ............... G06F 3/067; G06F 17/30067; G06F 17/30171; G06F 17/30194; G06F 17/30097; G06F 17/30221; H04L 67/1097; Y10S 707/956

See application file for complete search history.

(56) References Cited

U.S. PATENT DOCUMENTS

| | | | | |
|---|---|---|---|---|
| 7,120,631 | B1 * | 10/2006 | Vahalia | G06F 17/30171 |
| 2003/0187866 | A1 * | 10/2003 | Zelenka | G06F 17/30607 |
| 2009/0019047 | A1 * | 1/2009 | Anderson | G06F 17/30171 |
| 2009/0132552 | A1 * | 5/2009 | Adya | G06F 17/30094 |
| 2009/0271412 | A1 * | 10/2009 | Lacapra | G06F 17/30206 |

* cited by examiner

*Primary Examiner* — Tauqir Hussain
*Assistant Examiner* — Kamran Mohammadi
(74) *Attorney, Agent, or Firm* — Slater Matsil, LLP

(57) ABSTRACT

A client requests access to a resource (e.g., a file) via a node of a storage system. The resource is stored in a directory structure. A directory in the directory structure that includes the resource and that does not have any locks that conflict with the requested access to the resource is identified and selected. A revocable access privilege (e.g., a lock) on the selected directory is awarded to the node accessed by the client, and a directory-to-node association is established. Another association between the requested resource and the node is also established. If there is a subsequent request for the resource or for another resource within that directory, then a revoke notice for the directory access privilege is sent to the node.

16 Claims, 8 Drawing Sheets

LOCK ELEVATION IN A DISTRIBUTED FILE STORAGE SYSTEM

BACKGROUND

In a distributed or shared storage system (e.g., a network-attached storage (NAS) system or cluster), the potential for an error occurs when two or more clients or nodes are accessing the same resource (e.g., a file or piece of data). For example, an error could occur if two clients are permitted to read the same piece of data from a file, the first client updates the data and writes the new values back to the file, and the second client does not change the data but writes the old values back to the file, overwriting the updated values from the first client. To prevent this from occurring, a lock for the file is granted to the first client to access the file. Different types of locks (e.g., exclusive, shared, read-only, etc.) can be put in place depending on the type of access.

A software component known as a distributed lock manager (DLM) coordinates access requests, ensuring compatibility of access rights to resources such as files. The DLM tracks all lock requests, grants and tracks access privileges (locks) to resources, tracks requests for resources not currently available, and grants access privileges (locks) when the resources become available. The DLM keeps an inventory of all these lock requests, and communicates their status to the clients involved.

Generally speaking, for a client to access data in a file, the client first sends a request to the DLM, which performs the functions just described and either grants the lock right away or at a later time when the resource becomes available. Once the client is done with the resource, the lock may be released. The process is repeated each time a client wants to access the resource.

Thus, when a resource is being accessed, a number of messages are sent back-and-forth between the clients and the DLM, which can consume network bandwidth and computational resources and can affect overall performance.

In distributed/shared storage systems, individual files are rarely accessed concurrently. In a corporate environment, for example, users have exclusive use of private folders. Resources in public folders are usually read-only. In general, resources like files are locked when opened but seldom get concurrent access requests from multiple clients. Yet, even if the resource is in a private folder or is read-only by default, a lock request is still sent to the DLM, the request is granted, the lock is then released, and so on. Consequently, bandwidth and computational resources are consumed and performance is affected because the process of requesting, granting, and releasing locks is performed even when no other client is actually able to access or affect the resource.

The demands placed on the DLM become more complicated when the NAS system is shared by clients that use different network protocols such as Network File System (NFS), Server Message Block (SMB), or the like. One client may hold a lock on a resource using one protocol and, if another client that uses another protocol requests access to that resource, then exhaustive validations across multiple parameters are needed to translate and resolve the competing requests. Those validations may result in a state transition such as opportunistic lock (oplock) or lease break and/or lock promotion/demotion. A generic DLM is likely to be incapable of performing such validations.

SUMMARY

In overview, in an embodiment according to the present invention, the first of the issues described above is addressed by awarding a lock on a directory that is the highest directory in the directory hierarchy containing the resource (e.g., file) for which a lock is requested provided no conflicting lock for another resource within the directory hierarchy is present. Once the lock is awarded to that directory, further requests for locks for any resources within the directory hierarchy up to that directory level are not required. Such locks can be revoked or the associated privileges can be modified (e.g., an exclusive lock can be changed to a read-cache lock) if a concurrent access request for the resource or for another resource in the directory hierarchy is received from another node/client. Alternatively, the lock can be demoted to a lower level directory.

In overview, in an embodiment according to the present invention, the second of the issues described above is addressed by equipping nodes in a storage system with the capability to resolve access conflicts. In one such embodiment, each node can execute a multiprotocol lock manager (also referred to herein as a multiprotocol access handler) that uses protocol-specific validation logic to resolve such conflicts.

In one embodiment, a resource (e.g., a file or piece of data) is stored in a hierarchical (e.g., tree-like) directory structure, and a client requests access to the resource via a node of a storage system (e.g., a shared or distributed storage system). In one such embodiment, the highest-level directory in the directory structure that includes the resource and that does not have any locks that conflict with the requested access to the resource is identified and selected. A revocable access privilege (e.g., a lock) on the selected directory is awarded to the node accessed by the client, and a directory-to-node association is established. Another association between the requested resource and the node is also established. If there is a subsequent request for the resource or for another resource within that directory, then a revoke notice for the directory access privilege is sent to the node. Also, pertinent information is forwarded to the node identified using the resource-to-node association, and that node uses its protocol-specific validation logic to resolve any conflict between the lock in place and the new request.

Embodiments according to the present invention improve access performance and reduce traffic in a shared or distributed storage systems such as NAS systems by reducing the number of lock requests, and also provide protocol-aware access validation in a multiprotocol environment.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
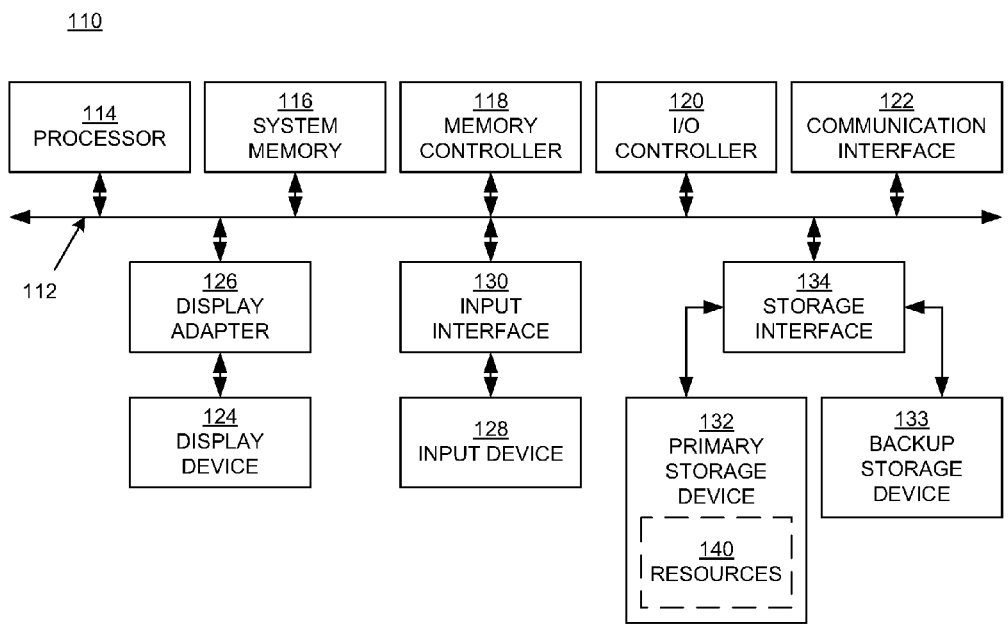
FIG. 1 is a block diagram of an example of a computing system capable of implementing embodiments according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "identifying," "associating," "revoking," "granting," "hashing", "resolving," "requesting," "comparing," "sending," "climbing," and "traversing," or the like, refer to actions and processes (e.g., flowcharts 800 and 900 of FIGS. 8 and 9, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Computing System and Storage System

Figure 2:
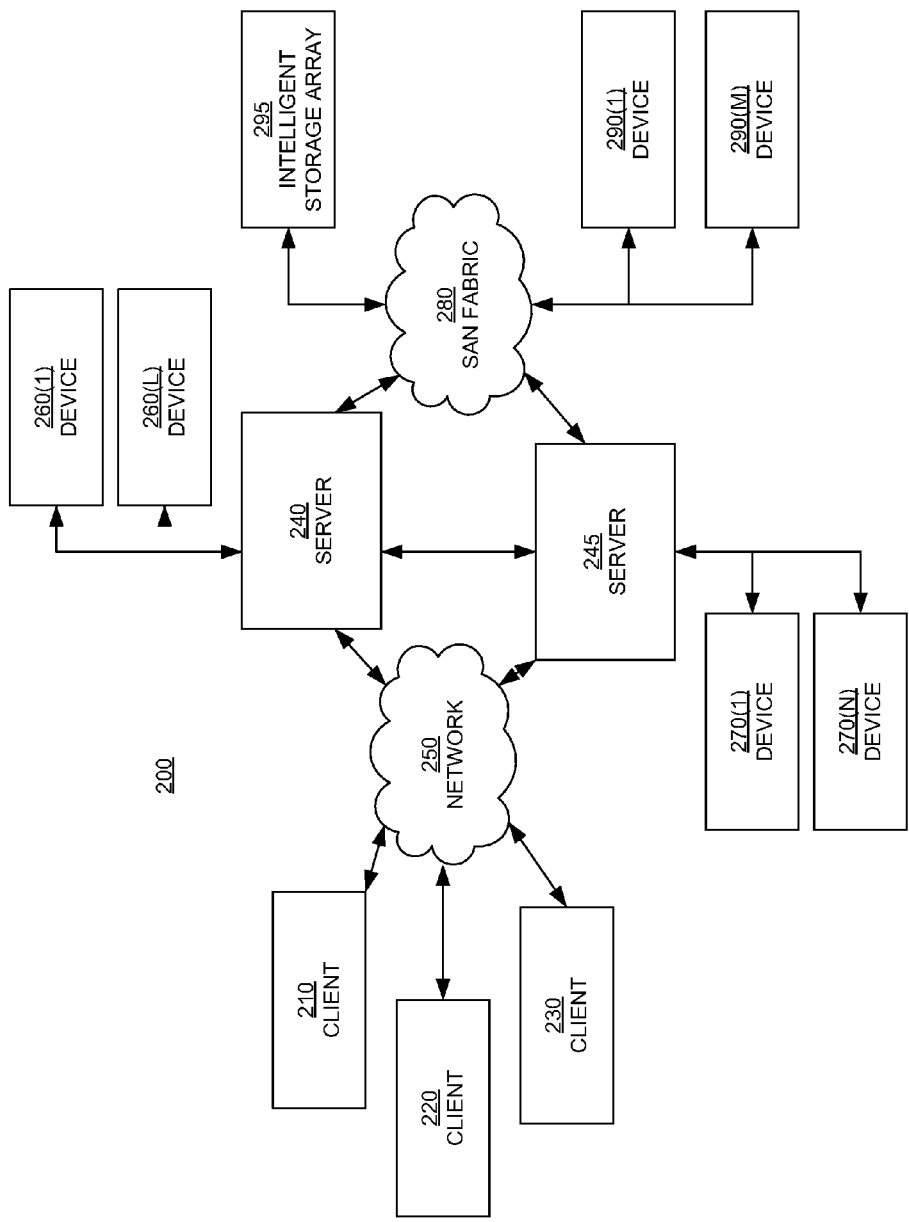
FIG. 2 is a block diagram of an example of a storage system capable of implementing embodiments according to the present invention.

FIG. 1 is a block diagram of an example of a computing system capable of implementing embodiments of the present disclosure. FIG. 2 is a block diagram of an example of a storage system capable of implementing embodiments according to the present disclosure.

With reference first to FIG. 1, the computing system 110 broadly represents any single or multi-processor computing device or system capable of executing computer-readable instructions. In its most basic configuration, the computing system 110 may include at least one processor 114 and a system memory 116.

The processor 114 generally represents any type or form of processing unit capable of processing data or interpreting and executing instructions. In certain embodiments, the processor 114 may receive instructions from a software application or module. These instructions may cause the processor 114 to perform the functions of one or more of the example embodiments described and/or illustrated herein. For example, the processor 114 may perform and/or be a means for performing, either alone or in combination with other elements, one or more of the receiving, identifying, associating, revoking, granting, hashing, resolving, requesting, comparing, sending, and traversing operations described herein. The processor 114 may also perform and/or be a means for performing any other steps, methods, or processes described and/or illustrated herein.

The system memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments the computing system 110 may include both a volatile memory unit (such as, for example, system memory 116) and a non-volatile storage device (such as, for example, the primary storage device 132).

The computing system 110 may also include one or more components or elements in addition to the processor 114 and the system memory 116. For example, in the embodiment of FIG. 1, the computing system 110 includes a memory controller 118, an input/output (I/O) controller 120, and a communication interface 122, each of which may be interconnected via a communication infrastructure 112. The communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

The memory controller 118 generally represents any type or form of device capable of handling memory or data or controlling communication between one or more components of the computing system 110. For example, the memory controller 118 may control communication between the processor 114, system memory 116, and the I/O controller 120 via the communication infrastructure 112. The memory controller 118 may perform and/or be a means for performing, either alone or in combination with other elements, one or more of the operations or features described herein.

The I/O controller 120 generally represents any type or form of module capable of coordinating and/or controlling the input and output functions of a computing device. For example, the I/O controller 120 may control or facilitate transfer of data between one or more elements of the computing system 110, such as the processor 114, system memory 116, the communication interface 122, the display adapter 126, the input interface 130, and the storage interface 134. The I/O controller 120 may be used, for example, to perform and/or be a means for performing, either alone or in combination with other elements, one or more of the operations described herein. The I/O controller 120 may also be used to perform and/or be a means for performing other operations and features set forth in the instant disclosure.

The communication interface 122 broadly represents any type or form of communication device or adapter capable of facilitating communication between the example computing system 110 and one or more additional devices. For example, the communication interface 122 may facilitate communication between the computing system 110 and a private or public network including additional computing systems. Examples of the communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through, for example, a local area network (such as an Ethernet network), a personal area network, a telephone or cable network, a cellular telephone connection, a satellite data connection, or any other suitable connection.

The communication interface 122 may also represent a host adapter configured to facilitate communication between the computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. The communication interface 122 may also allow the computing system 110 to engage in distributed or remote computing. For example, the communication interface 122 may receive instructions from a remote device or send instructions to a remote device for execution. The communication interface 122 may perform and/or be a means for performing, either alone or in combination with other elements, one or more of the operations disclosed herein. The communication interface 122 may also be used to perform and/or be a means for performing other operations and features set forth in the instant disclosure.

As illustrated in FIG. 1, the computing system 110 may also include at least one display device 124 coupled to the communication infrastructure 112 via a display adapter 126. The optional display device 124 generally represents any type or form of device capable of visually displaying information forwarded by the display adapter 126. Similarly, the display adapter 126 generally represents any type or form of device configured to forward graphics, text, and other data from the communication infrastructure 112 (or from a frame buffer, as known in the art) for display on the display device 124.

As illustrated in FIG. 1, the computing system 110 may also include at least one input device 128 coupled to the communication infrastructure 112 via an input interface 130. The input device 128 generally represents any type or form of input device capable of providing input, either computer-generated or human-generated, to the computing system 110. Examples of the input device 128 include, without limitation, a keyboard, a pointing device, a speech recognition device, or any other input device.

As illustrated in FIG. 1, the computing system 110 may also include a primary storage device 132 and a backup storage device 133 coupled to the communication infrastructure 112 via a storage interface 134. The storage devices 132 and 133 generally represent any type or form of storage device or medium capable of storing data and/or other computer-readable instructions. For example, the storage devices 132 and 133 may be a magnetic disk drive (e.g., a so-called hard drive), a floppy disk drive, a magnetic tape drive, an optical disk drive, a flash drive, or the like. The storage devices 132 and 133 may be a part of the computing system 110 or may be separate devices accessed through other interface systems. The storage devices 132 and 133 may be arranged into logical, redundant storage containers or RAID (redundant array of independent disks) arrays. The storage interface 134 generally represents any type or form of interface or device for transferring data between the storage devices 132 and 133 and other components of the computing system 110.

In one example, a resource 140 may be stored in the primary storage device 132. The resource 140 may represent a file or a portion of a file. For example, the resource 140 may represent (be stored on) a portion of computing system 110 and/or portions of the example network architecture 200 in FIG. 2 (below). Alternatively, the resource 140 may represent (be stored on) one or more physically separate devices capable of being accessed by a computing device, such as the computing system 110 and/or portions of the network architecture 200.

Many other devices or subsystems may be connected to the computing system 110. Conversely, all of the components and devices illustrated in FIG. 1 need not be present to practice the embodiments described herein. The devices and subsystems referenced above may also be interconnected in different ways from that shown in FIG. 1. The computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of the storage devices 132 and 133. When executed by the processor 114, a computer program loaded into the computing system 110 may cause the processor 114 to perform and/or be a means for performing the functions of the example embodiments described and/or illustrated herein. Additionally or alternatively, the example embodiments described and/or illustrated herein may be implemented in firmware and/or hardware.

FIG. 2 is a block diagram of an example of a network architecture 200 in which client systems 210, 220, and 230 and servers 240 and 245 may be coupled to a network 250. The client systems 210, 220, and 230 and servers 240 and 245 generally represent any type or form of computing device or system, such as the computing system 110 of FIG. 1.

The servers 240 and 245 also generally represent computing devices or systems configured to provide various services and/or run certain software applications that will be described further below. The network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to the server 240. Similarly, one or more storage devices 270(1)-(N) may be directly attached to the server 245. The storage devices 260(1)-(L) and storage devices 270(1)-(N) generally represent any type or form of storage device or medium capable of storing data and/or other computer-readable instructions such as the computing device 110 of FIG. 1. The storage devices 260(1)-(L) and storage devices 270(1)-(N) may represent network-attached storage (NAS) devices configured to communicate with the servers 240 and 245 using various protocols, such as Network File System (NFS), Server Message Block (SMB), or Common Internet File System (CIFS).

The servers 240 and 245 may also be connected to a storage area network (SAN) fabric 280. The SAN fabric 280 generally represents any type or form of computer network or architecture capable of facilitating communication between storage devices. The SAN fabric 280 may facilitate communication between the servers 240 and 245 and the storage devices 290(1)-(M) and/or an intelligent storage array 295. The SAN fabric 280 may also facilitate, via the network 250 and the servers 240 and 245, communication between the client systems 210, 220, and 230 and the storage devices 290(1)-(M) and/or intelligent storage array 295 in such a manner that the devices 290(1)-(M) and the array 295 appear as locally attached devices to the client systems 210, 220, and 230. As with the storage devices 260(1)-(L) and the storage devices 270(1)-(N), the storage devices 290(1)-(M) and the intelligent storage array 295 generally represent any type or form of storage device or medium capable of storing data and/or other computer-readable instructions such as the computing device 110 of FIG. 1.

With reference to FIGS. 1 and 2, a resource 140 (e.g., a file) may be stored across multiple physical storage devices (e.g., the storage devices 260(1)-(L), storage devices 270(1)-(N), storage devices 290(1)-(M), or intelligent storage array 295) in a manner that is transparent to the client systems 210, 220, and 230. Each of client systems 210, 220, and 230 can access a resource or resources from one or more of the physical storage devices via the servers 240 and 245.

More specifically, with reference also to the computing system 110 of FIG. 1, a communication interface, such as communication interface 122, may be used to provide connectivity between each client system 210, 220, and 230 and the network 250. The client systems 210, 220, and 230 may be able to access information on the server 240 or 245 using, for example, a Web browser or other client software. Such software may allow the client systems 210, 220, and 230 to access data hosted by the server 240 and server 245, which they retrieve from the storage devices 260(1)-(L), storage devices 270(1)-(N), storage devices 290(1)-(M), and/or intelligent storage array 295. Although FIG. 2 depicts the use of a network (such as the Internet) for exchanging data, the embodiments described herein are not limited to the Internet or any particular network-based environment. Thus, the servers 240 and 245 may communicate to each other outside the network 250.

The servers 240 and 245 are examples of what is generally referred to herein as a node. In general, a node refers to a system, device, or component that provides the functionality of a node as will be described below, and may be a physical device or a virtual machine.

Figure 3:
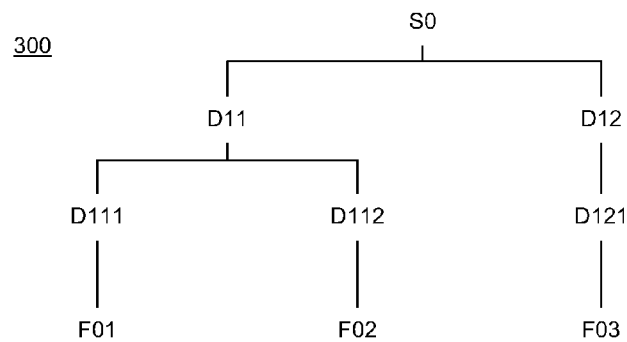
FIG. 3 illustrates an example of a directory structure in an embodiment according to the present invention.

FIG. 3 illustrates an example of a directory structure 300 in an embodiment according to the present invention. The directory structure 300 is arranged as a hierarchy of directories including a share directory S0, directories D11 and D12 that are essentially sub-directories of the directory S0, directories D111 and D112 that are essentially sub-directories of the directory D11, and directory D121 that is essentially a sub-directory of the directory D12. In the vernacular, the directory structure 300 is described as being tree-like. The share directory S0 can be accessed by any of the nodes, either directly or via another node.

As presented above, a resource stored within the directory structure 300 may be stored across multiple physical devices (e.g., the storage devices 260(1)-(L), storage devices 270(1)-(N), storage devices 290(1)-(M), and/or intelligent storage array 295 of FIG. 2). Similarly, the share directory S0 and the other directories in the directory structure 300 may be stored across multiple physical devices.

In the example of FIG. 3, a file F01 is stored in the directory D111 (and is thus also within the directories D11 and S0), a file F02 is stored in the directory D112 (and is thus also within the directories D11 and S0), and a file F03 is stored in the directory D121 (and is thus also within the directories D12 and S0).

Using a Directory-Level Lock in a Storage System

In overview, embodiments according to the present invention award locks for the directory of the resource for which a lock is requested. Once the lock is awarded to the directory, further requests for locks for any resources within that directory are not required. Such locks can be revoked or the associated privileges can be modified (e.g., an exclusive lock can be changed to a read-cache lock) if a concurrent access request for the resource or for another resource in the directory is received from another node/client. Alternatively, the lock can be demoted to a lower-level directory while maintaining the same privileges (e.g., an exclusive lock that was awarded to directory S0 can be demoted to directory D11). Furthermore, in embodiments according to the present invention, each node in the storage system (e.g., each of the servers 240 and 245 of FIG. 2) has the capability to resolve access conflicts. In one embodiment, each node can execute a multiprotocol lock manager (also referred to herein as a multiprotocol access handler) that uses protocol-specific validation logic to resolve conflicts.

Figure 4:
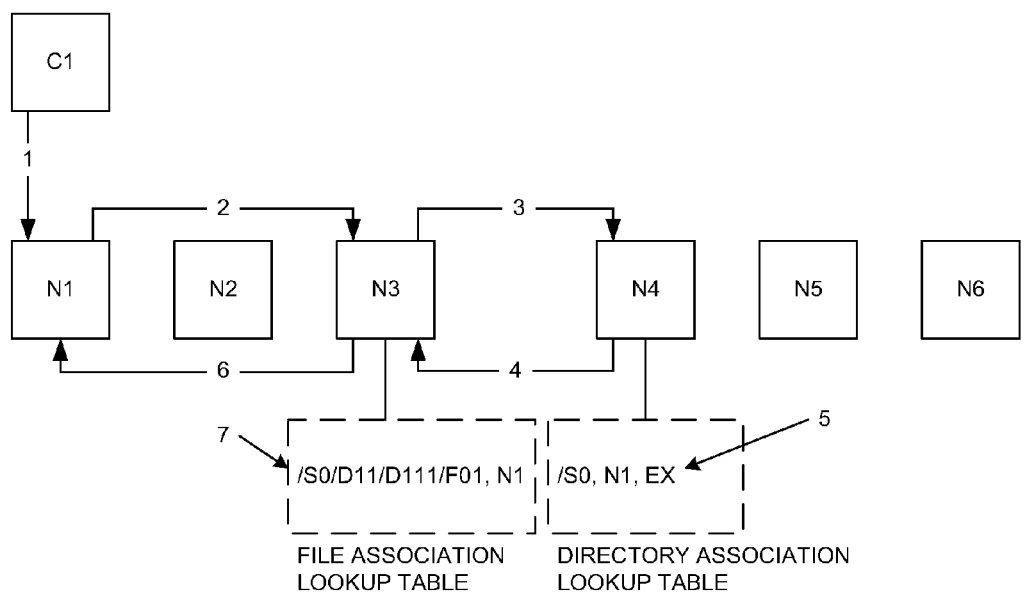
FIGS. 4, 5, and 6 illustrate examples of interactions between nodes in a storage system in an embodiment according to the present invention.
Figure 5:
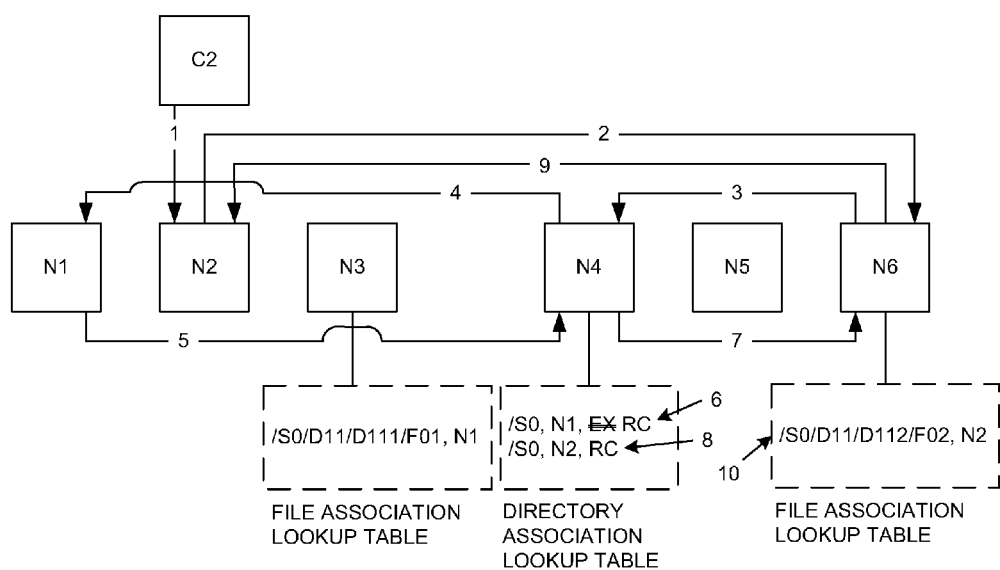
Figure 6:
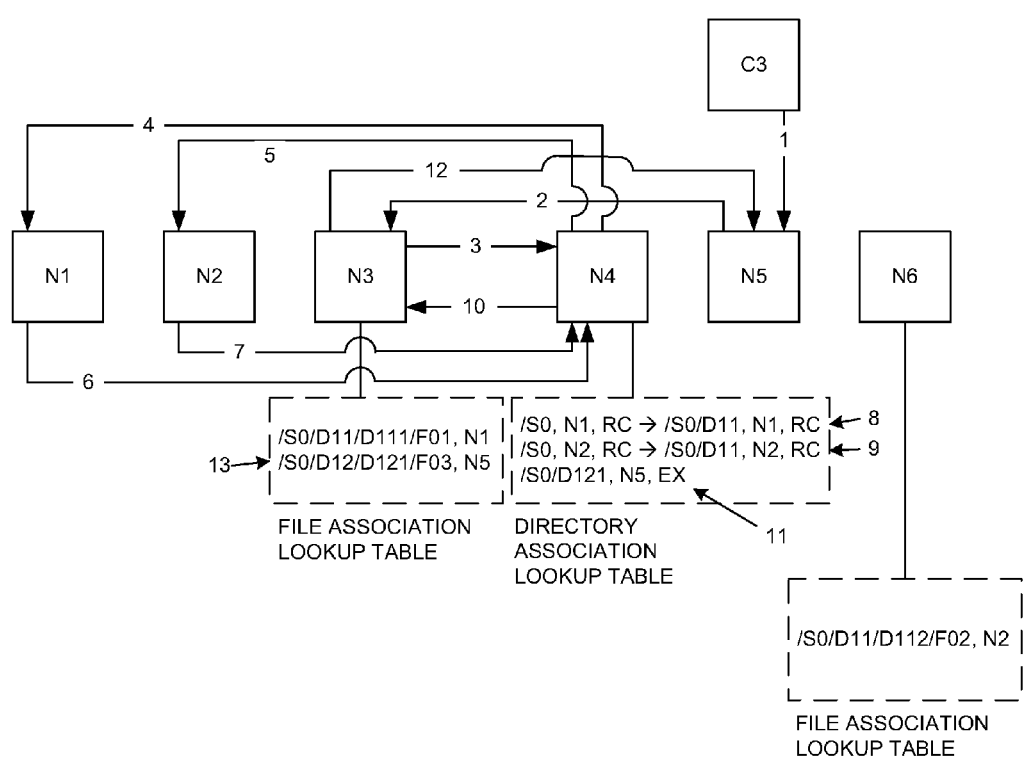

FIGS. 4, 5, and 6 illustrate examples of interactions between nodes N1-N6 in a storage system (e.g., the servers 240 and 245 of FIG. 2) in an embodiment according to the present invention. The nodes N1-N6 can each be implemented using some or all of the components of a computing system such as the computing system 110 of FIG. 1.

One or more or all of the nodes may serve as a file lookup node, and one or more or all of the nodes may serve as a directory lookup node. A node may serve as both a file lookup node and directory lookup node. The functions performed by file lookup nodes and directory lookup nodes will be presented in the discussion below. In the example of FIGS. 4-6, nodes 3 and 6 are each file lookup nodes, and node 4 is a directory lookup node.

When a node (e.g., N1) receives a request to open a file from a client (e.g., C1, corresponding to one of the clients 210, 220, or 230 of FIG. 2), the corresponding file lookup node (e.g., N3) for the file is consulted to check if the file is associated with another node (that is, the check determines whether another node is concurrently accessing the file). In one embodiment, to find the file lookup node where a file's association will be and is maintained, a hash function is applied to the fully qualified file name. A fully qualified file name is a term of art, and is used herein to mean an exact name that is completely specified so that it unambiguously and uniquely identifies a single file.

Continuing with reference to FIG. 4, the file lookup node (N3) maintains a file association lookup table that lists file-to-node associations. If no association is found, a new association is created between the file and the requesting node (N1) and added to the file association lookup table. All subsequent requests to open the file will then be sent to the associated node (N1) for validation. The associated node (N1) will use the correct protocol module to conduct protocol-specific validation and resolve any conflicts between concurrent access requests.

On the other hand, if an association to another node (e.g., N5) is found in the file association lookup table, then the request by node N1 to open the file will be sent to that node (N5), which will use the correct protocol module to conduct protocol-specific validation and resolve the conflicting requests.

Thus, instead of maintaining locks, the file lookup node (N3) maintains, in a file association lookup table, an association between a file (a resource) and the node (N1) where the state of the file is maintained.

In a similar fashion, a directory lookup node (e.g., N4) maintains directory associations in a directory association lookup table. In one embodiment, the directory associations for the share directory S0, including all of the directories within the share directory S0, are maintained within a single directory lookup node (N4), so that it is not necessary to use a hashing function to identify which node is maintaining the directory association for a particular directory. Also, maintaining directory associations for the share directory S0 on a single directory lookup node facilitates lock promotion and demotion, as will be seen by the discussion further below. If there are multiple share directories, their respective associations can be distributed across the nodes identified as directory lookup nodes.

In conjunction with the creation of a file association as described above, a directory association is created in the directory association lookup table maintained by the directory lookup node (N4). The file association and the directory association made in response to a request to access a resource can be accomplished as one atomic operation.

A directory association associates revocable privileges (a revocable or opportunistic lock) with the requesting node (N1) and with one of the directories in the directory structure 300 (FIG. 3). In one embodiment, the directory with which the lock is associated is the highest-level directory in the directory structure 300 that includes the requested file (the file to be accessed by node N1) and that is not associated with another lock that conflicts with the type of access sought by the requesting node (N1). In such an embodiment, each directory lookup node has knowledge of the hierarchical (e.g., tree-like) arrangement of the directory structure 300, and can traverse the directory tree to identify the highest-level directory that does not have associated lock that conflicts with another lock.

Thus, unlike conventional implementations of opportunistic locks, the coverage provided by revocable privileges is elevated to the directory level. In one embodiment, the coverage provided by revocable privileges is elevated to the highest-level directory level for which the highest level of privileges can be granted.

Once a directory is identified and selected, then a revocable lock with suitable privileges is associated with that directory and with the requesting node (N1) and the directory association lookup table is updated. That is, a new association is created between the selected directory, the requesting node (e.g., N1), and a lock (e.g., an exclusive lock) and added to the directory association lookup table.

For ease of discussion, the directory that is associated with the lock may be referred to herein as the owner directory. Also, as used herein, a lock has privileges associated inherently therewith. For example, a lock may be an exclusive lock; an exclusive privilege is associated with such a lock. Thus, as used herein, to grant a lock is to grant privileges, and therefore the terms "lock" and "privilege" may be used interchangeably herein. Accordingly, the directory association lookup table can be said to associate a directory, a node, and a lock, or it can be said to associate a directory, a node, and a privilege.

When a subsequent (second) access request that conflicts with an existing directory-level lock is received, then a revoke notice for that lock is sent to the node that holds the privilege (e.g., node N1). However, that node (N1) has the opportunity to, for example, request a lower-level privilege (e.g., read-only instead of exclusive) or to request a lock with the same privileges for a directory that is at a lower level of the directory structure 300 of FIG. 3 relative to the level of the current owner directory. In the latter instance, node N1 can request an exclusive lock on directory D111, for example.

To provide node N1 with the opportunity to respond to the revoke notice, the revoke notice includes information about the second access request (the access request that triggered the revoke notice). The node that holds the privilege (node N1) can compare that information with the current privileges it holds and with the state of the opened file(s). As noted, each node (including node N1) is equipped with a multi-protocol lock manager (also referred to herein as a multi-protocol access handler) that uses protocol-specific validation logic to resolve such conflicts. The node N1 can resolve the conflict by, for example, flushing data, closing the file(s), requesting that a new association for the file(s) be generated, requesting a new privilege (lock), and/or maintaining the same type of lock but for a lower level within the directory structure 300.

With reference to FIG. 4, an example is presented in more detail to illustrate the process described above. In step 1, a client C1 establishes a session with node N1 in order to access file F01 (see FIG. 3). A fully qualified file name is specified: /S0/D11/D111/F01. A type of access is also specified, e.g., read-only (RO).

Node N1 hashes the fully qualified file name to identify the appropriate file lookup node, which is node N3 in this example. In step 2, node N1 sends a request to node N3. The request includes the fully qualified file name and the read-only request.

In step 3, the file lookup node (N3) sends a message to the appropriate directory lookup node, which is node N4 in this example. Node N3 can identify node N4 by hashing the fully qualified file name or a portion of it (e.g., share root "/S0"). Alternatively, node N4 can be designated as the directory lookup node for the share directory S0 and each of the file lookup nodes can be made aware of that ahead of time, thus avoiding hashing the file name. In one embodiment, the message from node N3 to node N4 includes the directory path to file F01, identifies node N1 as the requesting node, and identifies the type of request (read-cache (RC)).

In step 4, the directory lookup node (N4) accesses its directory association lookup table and can determine that, at this point, there are no entries in that table that conflict with the request from node N1. As a result, node N4 is able to grant an exclusive lock (Ex) (instead of the requested read-only lock) to node N1 and so notifies the file lookup node (N3). Also, the lock is for the entire share directory S0; that is, in this example, the share directory is the owner directory. In step 5, the directory association lookup table maintained by the directory lookup node (N4) is updated to include an entry that associates the owner directory (share directory S0), the requesting node (N1), and the granted lock (exclusive lock Ex).

In step 6, the file lookup node (N3) notifies node N1 that it can open file F01 and that it has exclusive access privilege on the share directory S0. The requesting node (N1) maintains the state of file F01 once the file is opened. In step 7, the file lookup node (N3) updates its file association lookup table to include an entry that associates file F01 and node N1.

The various steps just described and in the examples below do not have to be performed in the order described, and some of the steps may be performed in parallel with other steps.

In the example of FIG. 4, once the lock for the owner directory (share directory S0) is associated with the node N1 in the directory association lookup table, then node N1 does not need to request a lock for any file within the owner directory. This will significantly improve performance, particularly when files are relatively small.

FIG. 5 illustrates an example in which there is a subsequent and concurrent request by another node to a resource in the owner directory; that is, the example of FIG. 5 follows from the example of FIG. 4. In step 1 of FIG. 5, a client C2 establishes a session with node N2 in order to access file F02 (see FIG. 3). A fully qualified file name is specified: /S0/D11/D112/F02. A type of access is also specified, e.g., read-only (RO).

Node N2 hashes the fully qualified file name for file F02 to identify the appropriate file lookup node, which is node N6 in this example. In step 2 of FIG. 5, node N2 sends a request to node N6. The request includes the fully qualified file name for file F02 and the read-only request.

In step 3 of FIG. 5, the file lookup node (N6) sends a message to the appropriate directory lookup node, which is node N4 in this example. As noted above, node N6 can identify node N4 by hashing the fully qualified file name for file F02 or a portion of it (e.g., share root "ISO"), or node N4 can be designated as the directory lookup node for the share directory S0. In one embodiment, the message from node N6 to node N4 includes the directory path to file F02, identifies node N2 as the requesting node, and identifies the type of request (read-cache (RC)).

In step 4 of FIG. 5, the directory lookup node (N4) sends a revoke notice to node N1 to revoke the existing exclusive lock associated with node N1. The revoke notice also includes information that provides node N1 with the opportunity to respond by, for example, adjusting the level of privileges. More specifically, in one embodiment, the revoke notice specifies the full directory path for file F02 and the type of access requested by node N2 (e.g., RC).

Node 1 utilizes its multiprotocol access handler to conduct protocol-specific validation in response to the revoke notice. Node N1 responds to the revoke notice by, for example, flushing data, closing the file, requesting that a new association for the file be generated, requesting a new privilege (lock), and/or maintaining the same type of lock but at a lower level within the directory structure 300. In the example of FIG. 5, in step 5, node 1 sends a message to the directory lookup node (N4) requesting that a new (demoted) privilege (e.g., RC) be associated with the owner directory (share directory S0).

In step 6 of FIG. 5, the directory association table maintained by the directory lookup node (N4) is updated to change the lock/privilege associated with the owner directory (S0) and node N1 from exclusive to read-cache.

In step 7 of FIG. 5, the directory lookup node (N4) accesses its directory association lookup table and can determine that, at this point, there are now no entries in that table that conflict with the request from node N2. In this example, the share directory S0 is still the highest-level directory in the directory structure 300 that includes file F02 and that does not have an associated lock that conflicts with the type of access sought by the requesting node (N2). As a result, node N4 is able to grant a read-cache lock to node N2 for the share directory S0 and so notifies the file lookup node (N6). (Recall that node N6 is the file lookup node associated with this access request; see step 2.) In step 8, the directory association lookup table maintained by the directory lookup node (N4) is updated to include an entry that associates the share directory S0, the node N2, and the read-cache lock RC.

In step 9, the file lookup node (N6) notifies node N2 that it can open file F02 and that it has a read-cache access privilege on the share directory S0. In step 10, the file lookup node (N6) updates its file association lookup table to include an entry that associates file F02 and node N2.

In the example of FIG. 5, if the access to file F01 or file F02 is closed, then the file association lookup tables and the directory association lookup table can be updated and a new (promoted) lock can be granted. For example, if node N2 closes file F02, then node N2 can notify the appropriate file lookup node (N6) to remove the corresponding entry from the file association lookup table maintained by node N6. Node N6 in turn can notify the directory lookup node (N4) that node N2 has closed file F02, and in response node N4 can determine if there are any other active access requests associated with the owner directory by reviewing the entries in the directory association lookup table maintained by node N4. In the example of FIG. 5, the only remaining entry in the directory association lookup table is the one associated with node N1. Hence, node N4 can promote the existing read-cache lock to, for example, an exclusive lock and can then notify node N1 of the new lock/privilege. Note, however, that it is not necessary to update the file association lookup table and directory association lookup table when a file is closed.

FIG. 6 illustrates an example in which there is another subsequent and concurrent request by another node to a resource in the owner directory; that is, the example of FIG. 6 follows from the examples of FIGS. 4 and 5. In step 1 of FIG. 6, a client C3 establishes a session with node N5 in order to access file F03 (see FIG. 3). A fully qualified file name is specified: /S0/D12/D121/F03. A type of access is also specified, e.g., write (W).

Node N5 hashes the fully qualified file name for file F03 to identify the appropriate file lookup node, which is node N3 in this example. In step 2 of FIG. 6, node N5 sends a request to node N3. The request includes the fully qualified file name for file F03 and the write request.

In step 3 of FIG. 6, the file lookup node (N3) sends a message to the appropriate directory lookup node, which is node N4 in this example. In one embodiment, the message from node N3 to node N4 includes the directory path to file F03, identifies node N5 as the requesting node, and identifies the type of request (write).

In step 4 of FIG. 6, the directory lookup node (N4) sends a revoke notice to node N1 to revoke the existing read-cache lock associated with node N1. The revoke notice also includes information that provides node N1 with the opportunity to respond by, for example, adjusting the level of privileges. More specifically, in one embodiment, the revoke notice specifies the full directory path for file F03 and the type of access requested by node N5 (e.g., W).

In step 5 of FIG. 6, the directory lookup node (N4) also sends a revoke notice to node N2 to revoke the existing read-cache lock associated with node N2. The revoke notice also includes information that provides node N2 with the opportunity to respond by, for example, adjusting the level of privileges. More specifically, as above, the revoke notice can specify the full directory path for file F03 and the type of access requested by node N5 (e.g., W).

Node N1 and node N2 each checks the states of the currently opened files against the request from node N5. In the example of FIG. 6, both node N1 and node N2 independently decide to maintain the existing privilege but for a directory (e.g., D11) that is lower in the hierarchy than the current owner directory (S0). In steps 6 and 7 of FIG. 6, node N1 and node N2 each send a message to the directory lookup node (N4) requesting that the existing privilege (RC) be associated with the lower level directory (D11). Note that, in this example, directory D11 is the highest-level directory in the directory structure 300 (FIG. 3) that includes the files F01 and F02 and is not associated with a lock that conflicts with the write access requested by node N5. To put it another way, directory D11 is the highest-level directory in the directory structure 300 (FIG. 3) that was within (e.g., was a sub-directory of) the immediately prior owner directory S0 and is not associated with a lock that conflicts with the write access requested by node N5.

In step 8 of FIG. 6, the directory association table maintained by the directory lookup node (N4) is updated to associate the RC lock/privilege associated with node N1 with the newest owner directory D11. In step 9 of FIG. 6, the directory association table maintained by the directory lookup node (N4) is updated to associate the RC lock/privilege associated with node N2 with the newest owner directory D11.

In step 10 of FIG. 6, the directory lookup node (N4) accesses its directory association lookup table and can determine that, at this point, there are now no entries in that table that conflict with the request from node N5. In this example, the directory D12 is the highest-level directory in the directory structure 300 that includes file F03 and that does not have an associated lock that conflicts with the type of access sought by the requesting node (N5). As a result, node N4 is able to grant an exclusive lock to node N5 for the share directory D12 and so notifies the file lookup node (N3). (Recall that node N3 is the file lookup node associated with this access request; see step 2.) In step 11, the directory association lookup table maintained by the directory lookup node (N4) is updated to include an entry that associates the directory D12, the node N5, and the exclusive lock EX.

In step 12, the file lookup node (N3) notifies node N5 that it can open file F03 and that it has an exclusive access privilege on directory D12. In step 13, the file lookup node (N3) updates its file association lookup table to include an entry that associates file F03 and node N5.

The examples of FIGS. 4-6 can be extended to other scenarios in which additional concurrent access requests are made. The processes described by those examples can be implemented serially or in parallel in a continuous effort to handle multiple concurrent sessions.

Figure 7:
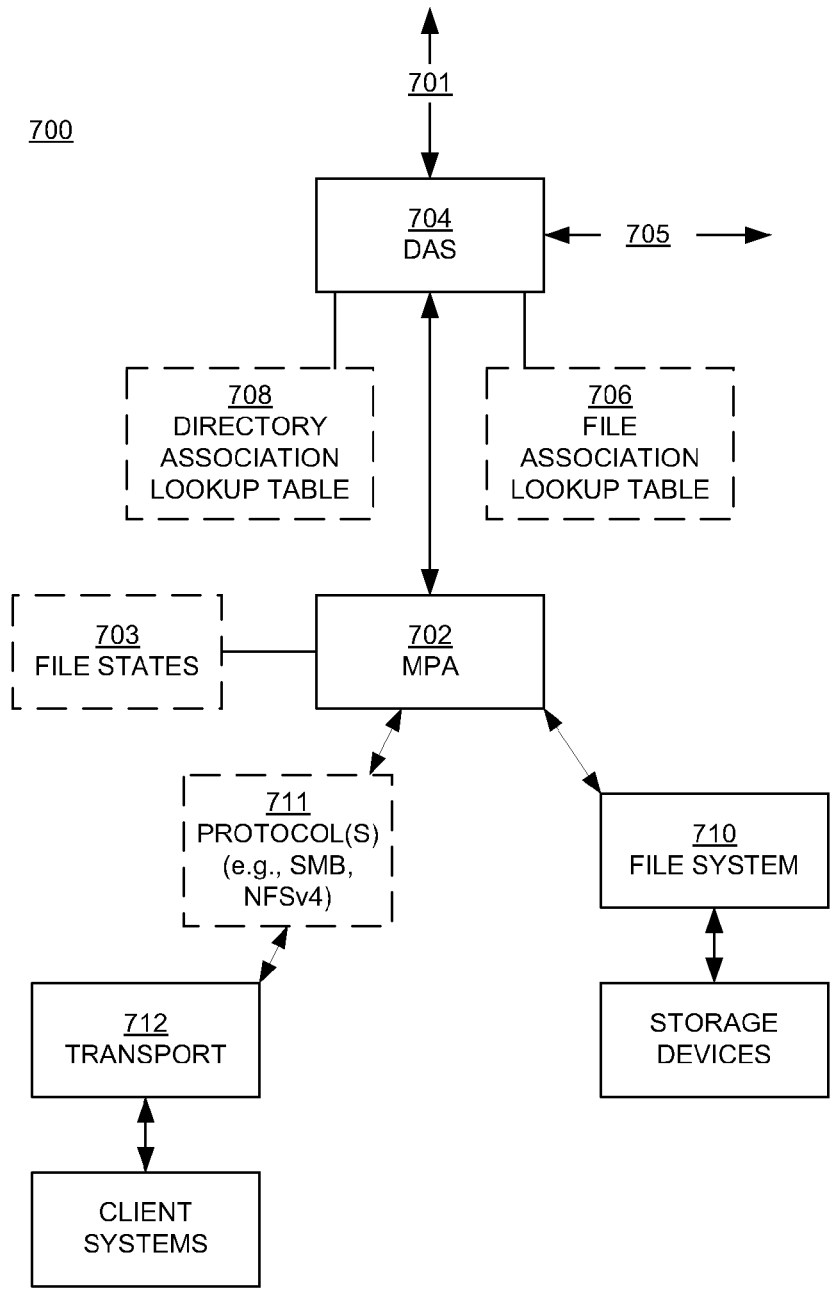
FIG. 7 is a block diagram showing various functional components within a node in embodiments according to the present invention.

FIG. 7 is a block diagram showing various functional components within a node 700 in an embodiment according to the present invention. Those functional components perform tasks in support of multiprotocol access and act as a gateway to interact with other nodes in a distributed storage environment. The node 700 can be implemented using some or all of the components of a computing system such as the computing system 110 of FIG. 1.

The node 700 of FIG. 7 is representative of the nodes N1-N6 in the examples of FIGS. 4-6, which in turn are representative of the servers 240 and 245 of FIG. 2. The node 700 can interact with other nodes in the storage system via the interface 701.

In the example of FIG. 7, the multiprotocol access (MPA) handler 702 maintains the states 703 of resources (e.g., open files) and provides protocol-specific validations to resolve conflicting access requests. In a distributed storage environment, the MPA handler 702 can interact with the distributed access service (DAS) 704 to resolve access conflicts between the nodes. In the FIG. 7 embodiment, the DAS 704 assumes the role of a distributed lock management authority.

In one embodiment, the node 700 can function as a file lookup node. In such an embodiment, instead of actually maintaining locks, the DAS 704 maintains a file association lookup table 706 that includes associations between resources (e.g., files) and the respective nodes where the current states of the resources are maintained. The DAS 704 can interface with a DAS in another node via the remote DAS interface 705. The file association lookup table 706 managed by the DAS 704 maintains a certain number of files based on the hash value on the file name. As previously discussed herein, in one embodiment, a DAS in a node that has received a new access request will hash the fully qualified file name to find the node and corresponding DAS that holds the association for the file. If an association is found, the DAS that holds the association for the file will validate the access.

In one embodiment, the node 700 can also, or instead, function as a directory lookup node. In such an embodiment, another function of the DAS 704 is to maintain directory associations in the directory association lookup table 708 and serve as the directory lookup authority. When a new file association is created, the file association authority (a DAS) will interact with the directory-association authority (another DAS) to determine non-conflicting access privileges.

In the example of FIG. 7, the node 700 can interact with the devices on which resources are stored (e.g., the storage devices 260(1)-(L), storage devices 270(1)-(N), storage devices 290(1)-(M), or intelligent storage array 295 of FIG. 2) via a network file system 710 using different network protocols 711 such as Network File System (NFS), Server Message Block (SMB), or the like. The node 700 can interact with a client device (e.g., the client systems 210, 220, and 230 of FIG. 2) via a transport mechanism 712 that uses a protocol such as File Transfer Protocol or HyperText Transport Protocol.

Figure 8:
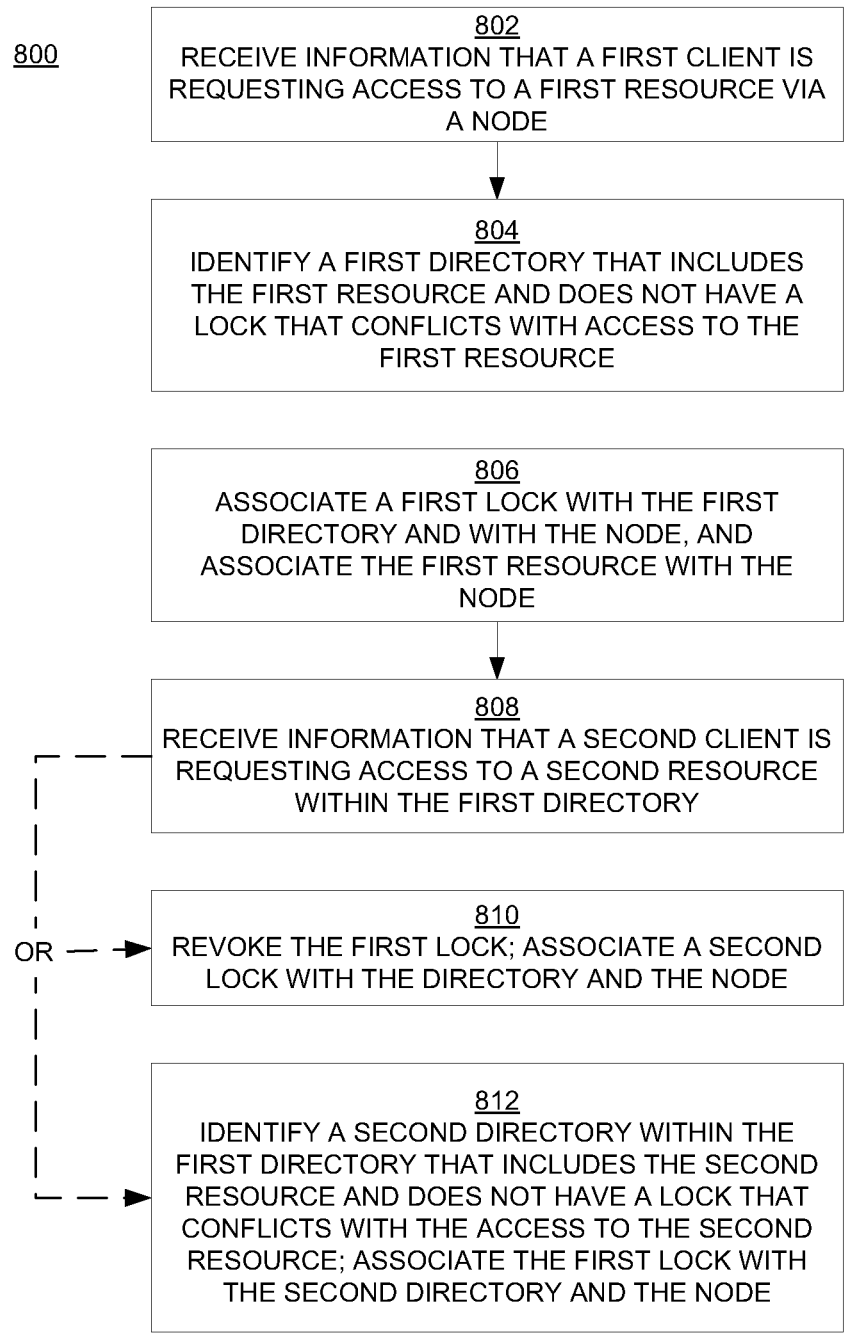
FIGS. 8 and 9 are flowcharts of examples of computer-implemented methods in embodiments according to the present invention.
Figure 9:
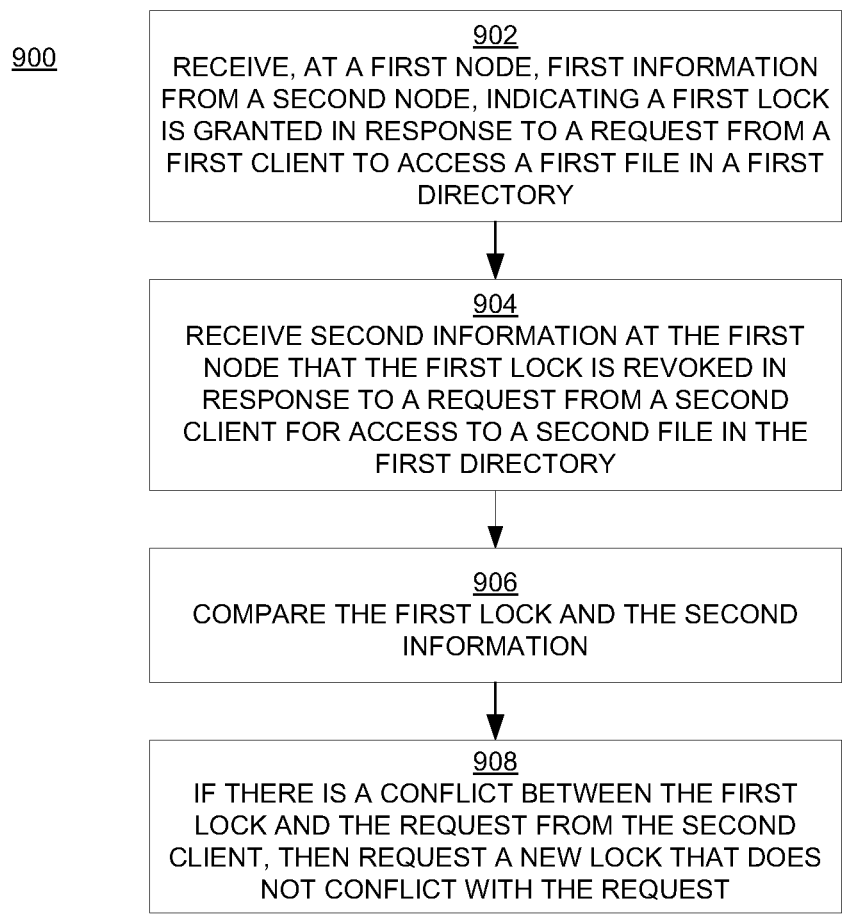

FIGS. 8 and 9 are flowcharts 800 and 900, respectively, of examples of computer-implemented methods in embodiments according to the present invention. The flowcharts 800 and 900 can be implemented as computer-executable instructions residing on some form of non-transitory computer-readable storage medium (e.g., using computing system 110 of FIG. 1). In particular, the operations included in the flowcharts 800 and 900 can be performed by a node or nodes in a distributed storage system such as that described above.

In block 802 of FIG. 8, with reference also to FIGS. 3-6, information is received that indicates a first client (e.g., client C1) is requesting access to a first resource (e.g., file F01) via a node (e.g., node N1) of a storage system.

In block 804, a first directory in a hierarchical directory structure is identified. In one embodiment, the first directory is the highest-level directory in the directory structure that includes the first resource and that does not have an associated lock that conflicts with the access to the first resource.

In block 806, a first lock is associated with the first directory and with the node (e.g., in a directory association lookup table), and the first resource is associated with the node (e.g., in a file association lookup table).

In block 808, information indicating a second client is requesting access to a second resource via a node is received, where the second resource is stored within the first directory.

In block 810, in response to the operations of block 808, the first lock is revoked, and a second lock (a different lock with different privileges) is associated with the first directory and with the node accessed by said first client, where the second lock does not conflict with the access requested by the second client.

In block 812, as an alternative to block 810 and in response to the operations of block 808, a second directory is identified, where the second directory is within the first directory (that is, at a lower level in the directory structure), includes the second resource, and has no locks associated therewith that conflict with the access to the second resource. The first lock is associated with the second directory and with the node accessed by the first client, and the first resource remains associated with the node accessed by the first client.

In block 902 of FIG. 9, first information is received at a first node in a data storage system. The first information is from a second node in the data storage system. The first information indicates that a first lock is granted in response to a request from a first client to access a first file stored in a hierarchical directory structure. The first lock is for a first directory in the directory structure that is the highest-level directory in the hierarchy that includes the first file and that does not have an associated lock that conflicts with the access to the first resource.

In block 904, second information is received at the first node. The second information indicates that the first lock is revoked in response to a request from a second client for access to a second file that is stored within the first directory. The second information includes a fully qualified file name for the second file and identifies a type of access associated with the request from the second client.

In block 906, the first node compares the second information and the first lock.

In block 908, in response to determining that there is a conflict between the first lock and the request from the second client, the first node requests a second lock that does not conflict with that request.

In summary, embodiments according to the present invention improve performance when accessing resources (e.g., opening and closing files). By associating a lock with a directory and a node in a storage system, it is not necessary to request another lock when accessing another resource in that directory. Traffic across nodes in the storage system is reduced because there are fewer lock requests. Protocol-dependent access validations are facilitated using multiprotocol access handlers on each of the nodes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method, comprising:
receiving first information that indicates a first client is requesting access to a first resource via a first node of a storage system comprising a plurality of nodes, wherein said first resource is stored in a directory structure comprising a hierarchy of directories, wherein said first information comprises a fully qualified file name, and wherein second information associating said first resource with said first node is stored on a node of said storage system that is identified by hashing said file name;
identifying a first directory in said hierarchy that includes said first resource and that has no locks associated therewith that conflict with said access to said first resource;
associating a first lock with said first directory and granting said first lock to said first node, and associating said first resource with said first node;
receiving third information that indicates a second client is requesting access to a second resource via a second node of said plurality of nodes, wherein said second resource is stored within said first directory; and
revoking said first lock and associating a second lock with said first directory and granting said second lock to said first node accessed by said first client, wherein said second lock has a demoted privilege for said first directory relative to said first lock.

2. The method of claim 1, wherein said first directory is at a highest-level directory in said directory structure that includes said first resource and that has no locks associated therewith that conflict with said access to said first resource.

3. The method of claim 1, further comprising associating a third lock with said first directory and granting said third lock to said second node accessed by said second client, and associating said second resource with said second node accessed by said second client, wherein said third lock and said first lock have compatible directory access privileges.

4. The method of claim 1, further comprising:
receiving fourth information that indicates a third client is requesting access to a third resource via a third node of said plurality of nodes, wherein said third resource is stored within said first directory;
identifying a second directory in said hierarchy that is within said first directory, includes said third resource, and has no locks associated therewith that conflict with said access to said third resource; and
associating said second lock with said second directory and granting said second lock to said first node accessed by said first client, wherein said first resource remains associated with said first node accessed by said first client.

5. The method of claim 4, wherein said second directory is a highest-level directory within said first directory that includes said third resource and that has no locks associated therewith that conflict with said access to said third resource.

6. The method of claim 1, wherein fifth information associating said first lock with said first directory and with said first node is stored on a node of said storage system that is associated with said first directory.

7. The method of claim 1, wherein each node of said plurality of nodes comprises a multiprotocol lock manager operable for resolving lock conflicts across said plurality of nodes.

8. A system, comprising:
a processor; and
memory coupled to said processor and having stored therein instructions that, executed by said system, cause said system to perform operations comprising:
receiving a request from a first client for access to a first file, wherein said first file is stored in a directory structure comprising a hierarchy of directories, wherein said request comprises a fully qualified file name for said first file;
requesting a first lock prior to accessing said first file;
receiving acknowledgement that said first lock is granted to said system, wherein said first lock is associated with a first directory in said hierarchy that is a highest-level directory in said directory structure that includes said first file and that has no locks associated therewith that conflict with said access to said first file, wherein a subsequent request from said first client for access to another file included in said first directory is accomplished without another request for a lock, and wherein information associating said first lock with said first directory is stored on a node of a data storage system that is identified by hashing said file name;
receiving first information that said first lock is revoked in response to a request from a second client for a type of access to a second file that is stored within said first directory;
requesting a second lock, wherein said second lock does not conflict with said type of access requested by said second client; and
receiving acknowledgement that said second lock is granted to said system, wherein said second lock is associated with the first directory, and wherein said second lock has a demoted privilege for said first directory relative to said first lock.

9. The system of claim 8, wherein said first information further comprises a second fully qualified file name for said second file, and said type of access.

10. The system of claim 8, wherein said operations further comprise:
comparing said type of access and said first lock; and
in response to determining that said type of access conflicts with said first lock, requesting said second lock for said first directory that does not conflict with said type of access.

11. The system of claim 8, further comprising:
receiving second information that said second lock is revoked in response to a request from a third client for a type of access to a third file that is stored within said first directory; and
requesting a third lock, wherein said third lock does not conflict with said type of access requested by said third client, wherein said third lock is placed on a second directory in said hierarchy that is a highest-level directory within said first directory that includes said third file and that has no locks associated therewith that conflict with said access to said third file.

12. The system of claim 8, wherein said operations further comprise:
hashing said file name to identify the node in the data storage system;
sending a request for said first lock to said node; and
receiving said acknowledgement from said node.

13. A non-transitory computer-readable storage medium having computer-executable instructions that, when executed, cause a first node in a data storage system to perform a method, said method comprising:
receiving, from a second node in said data storage system, first information that a first lock is granted to said first node in response to a request from a first client to access a first file stored in a directory structure comprising a hierarchy of directories, wherein said first lock is for a first directory in said directory structure that includes said first file and that has no locks associated therewith that conflict with said access to said first file, wherein said request from said first client comprises a fully qualified file name for said first file, and wherein information associating said first lock with said first node is stored on a node of said storage system that is identified by hashing said file name;
receiving second information that said first lock is revoked in response to a request from a second client for access to a second file that is stored within said first directory, said second information comprising a fully qualified file name for said second file and identifying a type of access associated with said request from said second client;
comparing said second information and said first lock;
in response to determining that there is a conflict between said first lock and said request from said second client, requesting a second lock that does not conflict with said request; and
receiving acknowledgement that said second lock is granted to said first node, wherein said second lock is for the first directory, and wherein said second lock has a demoted privilege for said first directory relative to said first lock.

14. The non-transitory computer-readable storage medium of claim 13, wherein said method further comprises:
receiving third information that said second lock is revoked in response to a request from a third client for access to a third file that is stored within said first directory, said third information comprising a fully qualified file name for said third file and identifying a type of access associated with said request from said third client;
comparing said third information and said second lock; and
in response to determining that there is a conflict between said second lock and said request from said third client, requesting a third lock that does not conflict with said request from said third client, wherein said third lock is for a second directory in said hierarchy within said first directory that includes said third file and that has no locks associated therewith that conflict with said request from said third client.

15. The non-transitory computer-readable storage medium of claim 14, wherein first directory in said directory structure is a highest-level directory in said hierarchy that includes said first file and that has no locks associated therewith that conflict with said access to said first file, and wherein said second directory in said hierarchy is a highest-level directory within said first directory that includes said second file and that has no locks associated therewith that conflict with said request from said second client.

16. The non-transitory computer-readable storage medium of claim 13, wherein said method further comprises:
hashing said file name to identify said second node;
wherein said second node stores the information associating said first file with said first node.

* * * * *